Figure 5:
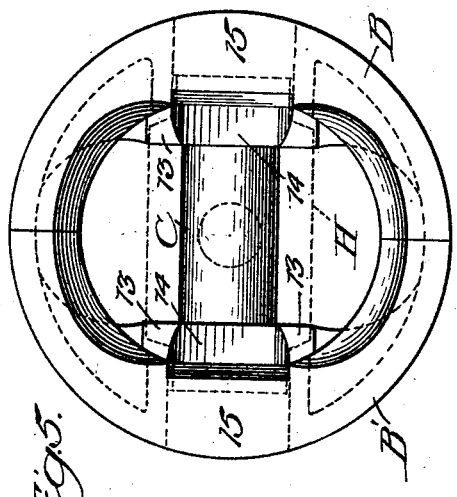

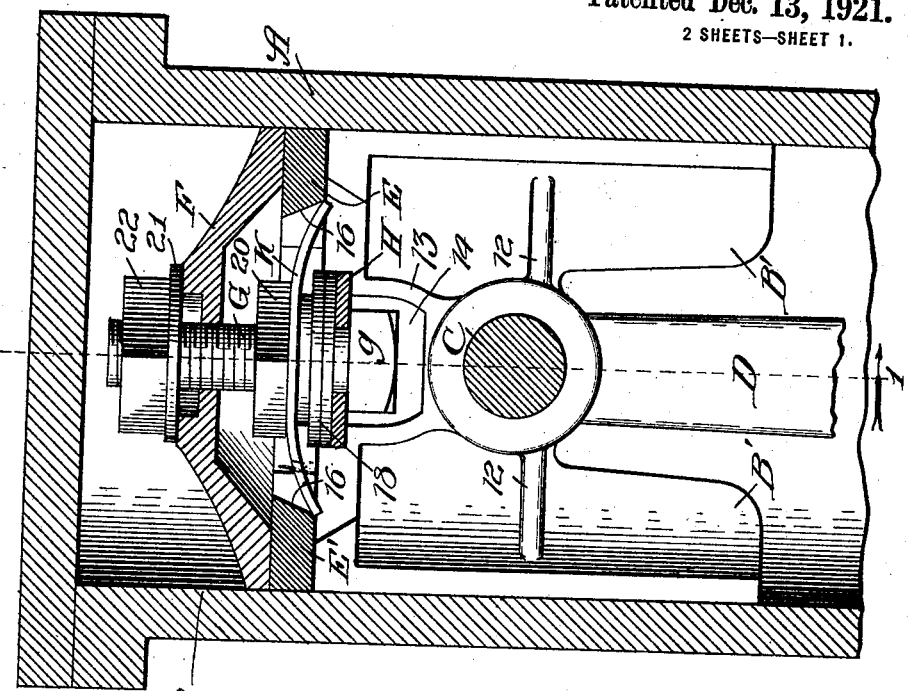
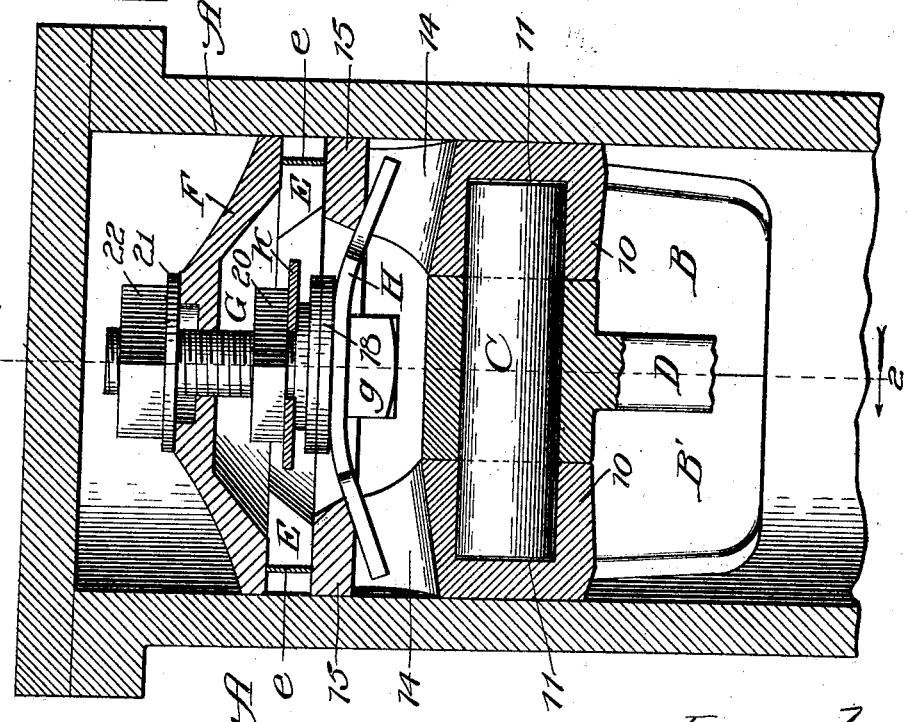

J. REIF.
PISTON.
APPLICATION FILED AUG. 9, 1918.

1,399,794.

Patented Dec. 13, 1921.
2 SHEETS—SHEET 2.

Inventor
Joseph Reif
By Paine, Fisher & Cloth
Attys.

UNITED STATES PATENT OFFICE.

JOSEPH REIF, OF HEBRON, INDIANA, ASSIGNOR OF FORTY-FIVE PER CENT. TO FRANCIS E. LING, OF HEBRON, INDIANA.

PISTON.

1,399,794.  Specification of Letters Patent.  Patented Dec. 13, 1921.

Application filed August 9, 1918. Serial No. 249,125.

*To all whom it may concern:*

Be it known that I, JOSEPH REIF, a citizen of the United States, residing at Hebron, in the county of Porter and State of Indiana, have invented certain new and useful Improvements in Pistons, of which I do declare the following to be a full, clear, and exact description, reference being had to the accompanying drawings, forming a part of this specification.

The present invention has for its object to provide an improved piston which, while more especially designed for internal combustion engines, is applicable to other engines. The main object of the invention is to provide means whereby the piston may be laterally expanded so as to compensate for wear and to insure at all times an accurate fit and movement of the piston within the cylinder.

The invention consists in the features of novelty hereinafter described, illustrated in the drawings and particularly pointed out in the claims at the end of this specification.

Figure 6:
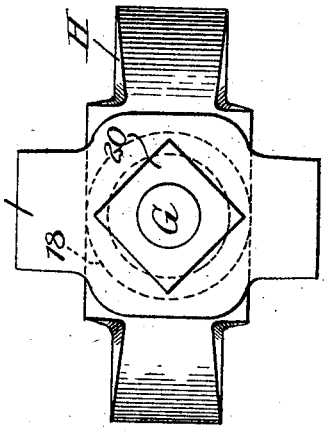
Figure 3:
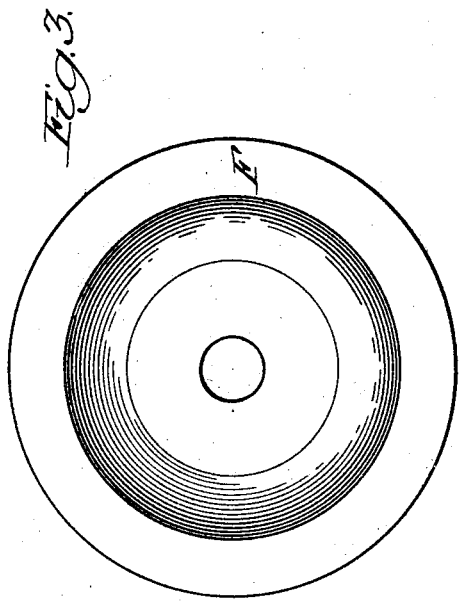
Figure 4:
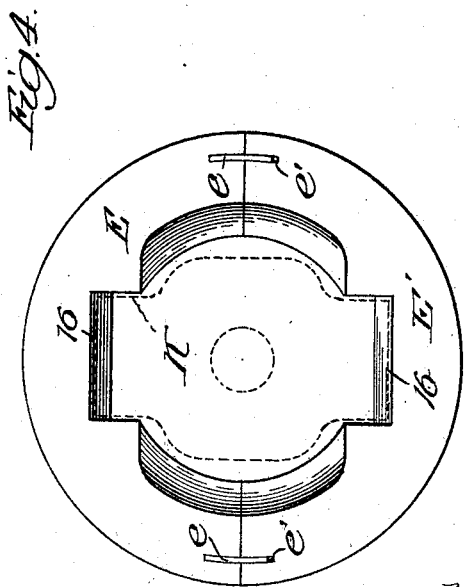

Figure 1 is a view in vertical section on line 1—1 of Fig. 2 through a cylinder containing a piston embodying my invention, parts being shown in elevation. Fig. 2 is a view in vertical section on line 2—2 of Fig. 1. Fig. 3 is an inverted plan view of the cap plate at the end of the piston. Fig. 4 is a detail plan view of a section of packing ring. Fig. 5 is a detail plan view of the body portion of the piston. Fig. 6 is a detail plan view showing the relative arrangement of the bar and plate for expanding the piston body and sectional rim.

In the accompanying drawings, A designates the cylinder of an internal combustion engine and B, B' designate the sections forming the main body of my improved piston. The main body of the piston is hollow and each of the sections B and B' is provided upon its interior with a boss 10 having a seat or pocket 11 adapted to receive one end of a transverse pin C to which will be connected the inner end of the piston rod D. As shown, ribs 12 and 13 formed integral with each of the bosses 10 and with the wall of the body sections B and B' serve to give greater strength to the sections. By thus forming the body of the piston of longitudinal sections having interior seats or pockets to receive the pin to which the piston rod is connected, all danger of the contact of the ends of the pin with the inner wall of the cylinder is avoided.

As shown, each of the body sections B and B' is provided near the boss 10 with a seat or opening 14 and around the interior of the body of the piston at one end extends an internal flange 15.

Against the end of the sections forming the main body of the piston is arranged an expansible metal ring, which in the preferred embodiment of the invention, is formed of the sections E and E'. As shown, one of these sections is provided at its ends with thin projecting metal strips e adapted to enter slots e' formed in the opposing ends of the opposite sections. Upon the interior of each of the ring sections E and E' is formed a downwardly and inwardly beveled face 16, the purpose of which will presently appear. Against the ring sections E and E' bears a plate or cap F that is preferably slightly chambered and is provided with a central hole through which passes an adjusting bolt G. Adjacent the head g of the bolt G is arranged a transverse bar H that is preferably formed of spring metal and is bowed or has its ends turned in downward direction. These ends of the bar H enter seats or openings 14 in the body sections B and B' and their upper faces bear against the portions of the annular flange beneath said seats or pockets 14. Hence, it will be seen that when the bar H is drawn upward by the bolt G, in a manner to be presently described, the upward movement of the ends of the spring bar H bearing against the portions of the annular flange above the seats 14, will tend to wedge or thrust outward the sections B and B' of the piston, and this outward thrust or movement of the piston sections will insure a uniform or square bearing of the piston body against the interior surface of the cylinder.

The bolt G also passes through a plate K that extends transversely of the ring sections E and E'. This plate K is preferably formed of spring steel and its ends bear against the inclined faces 16 of the ring sections E and E', the shoulders at the ends of these inclined faces serving to guard against any displacement of the plate K. As shown, a washer or washers 18 of suitable thickness are interposed between the bar H and the plate K. Hence, it will be seen that when the adjusting bolt G is drawn upward, the ends of the plate K will ride upward along the inclined seats 16 of the ring sections E and E' and will expand and force these sections outward, causing the periphery of the ring sections to bear against the wall of the cylinder A. A nut 20 on the bolt G serves to securely clamp the bar H and plate K to position upon the bolt. Upon the upper end of the bolt G is placed a washer 21 and a threaded nut 22. By turning this nut, the head of the bolt G will be moved upward drawing with it the bar H and plate K. The upward movement of the bar H will cause the expansion or outward movement of the sections B and B' of the body of the piston, while at the same time the upward movement of the plate K will cause the expansion or outward movement of the ring sections E and E', causing these parts to be snugly engaged with the wall of the cylinder A. Inasmuch as the ring sections E and E' are arranged to break joint with the body sections B, B' of the piston, the leakage of gas through the joints of the several sections is avoided.

I prefer to form the bar H and the plate K of spring metal because by so doing a certain degree of flexibility is given to the sections of the piston, insuring the accurate fit of the piston in the cylinder, while avoiding danger of binding or excessive wear of the parts.

While I have described what I regard as the preferred embodiment of the invention I wish it understood that the details of construction above set out may be varied without departing from the spirit of the invention and that features of the invention may be employed without its adoption as an entirety. Thus, while I have shown a single sectional ring E, it is obvious that any desired number of such rings may be used.

It will be seen, also, that the feature of providing a section ring or rings at the end of the piston body with spring mechanism for forcing said ring sections outwardly into bearing with the cylinder wall, and with a cap for exerting pressure upon said ring sections is important, whether the body of the piston be made of longitudinal sections or not, and for the following reason:

While the spring (such as a bar K) serves to force the ring sections into bearing with the cylinder wall, this would not be adequate to prevent the contraction of the ring sections (and consequent leakage) under the pressure within the cylinder; but by providing at the end of the piston a cap which bears upon the ring sections, the force of the pressure within the cylinder causes this cap to so tightly clamp the ring sections between it and the piston that the contraction of the ring sections is prevented and leakage of gas around these sections is resisted. This feature I regard as broadly new.

Having thus described my invention, what I claim as new and desire to secure by Letters Patent is:—

1. A piston of the character described, comprising a body composed of separate longitudinal sections, the walls of said sections being formed upon their interior with integral seats having closed outer ends and a pin for attachment to the piston rod, the outer ends of said pin terminating inside said seats.

2. The combination with a cylinder and a piston, of a cap disposed opposite to the end of the piston and movable toward and from the same, an expansible packing ring disposed between said cap and the piston end and adapted to be forced outwardly into bearing with the cylinder wall, a bolt passing through said cap and movable therewith, and means carried by said bolt for forcing outwardly said packing ring.

3. The combination with a cylinder and a piston, of a cap disposed opposite to the end of the piston and movable toward and from the piston end, an expansible packing ring disposed between said cap and the end of the piston, and adjustable means extending through said cap for controlling the outward thrust upon said packing ring, said ring being clamped in its expanded position by the pressure within the cylinder moving said cap toward the piston end.

4. The combination with a cylinder and a piston, of a cap disposed opposite to the outer end face of the piston and movable toward and from the same, an expansible packing ring interposed between said cap and the end of the piston and adapted to be forced outwardly into bearing with the cylinder wall, a transverse member located within said expansible ring and having its opposite ends engaging the interior surface of said ring, and means for shifting said member to adjust said ring.

5. A piston of the character described, comprising a body formed of longitudinal sections, means for expanding said sections laterally, a sectional ring at the end of said sections and breaking joint therewith, detachable means for laterally expanding said sectional ring, a piston rod, and a pin for attaching said piston rod to the piston.

6. A piston of the character described, comprising a body formed of longitudinal sections, a pin for attachment to the piston rod extending between and connected to said sections, and adjustable means for controllably expanding said sections.

7. A piston of the character described, comprising a body formed of longitudinal sections, a pin for attachment to the piston rod extending between and connected to said sections, and adjustable means for controllably expanding said sections in the direction of the axis of said pin.

8. A piston of the character described, comprising a body formed of longitudinal sections, a pin for attachment to the piston rod extending between and connected to said sections, and means for expanding said sections, said expanding means comprising a spring and means for adjusting said spring.

9. A piston of the character described, comprising a body formed of longitudinal sections, a pin for attachment to the piston rod extending between and connected to said sections, and means for expanding said sections, said expanding means comprising a transversely extending bar the ends of which engage said sections, and a bolt for adjusting said bar.

10. A piston of the character described, comprising a body formed of longitudinal sections, means for controllably adjusting said sections laterally, a sectional ring at the end of said sections and breaking joint therewith, and adjustable means for laterally expanding said sectional ring.

11. A piston of the character described, comprising a body formed of longitudinal sections, means for adjusting said sections laterally, an expansible ring located at one end of said sections, a transverse bar located within said expansible ring and having its opposite ends engaging the interior surface of said ring, and means for shifting said bar to adjust said ring.

12. A piston of the character described, comprising a body formed of longitudinal sections, means for adjusting said sections laterally, a sectional ring at one end of said body and breaking joint therewith, means for adjusting said ring sections laterally, a plate adjacent said ring sections, and a bolt passing through said plate and through the means whereby the body sections and the ring sections are adjusted, and a nut for said bolt.

13. A piston of the character described, comprising a body formed of adjustable sections, means for adjusting said sections, a ring formed of sections arranged to break joint with the sections of said body, said ring sections having inclined surfaces upon their interior, and an adjustable bar having ends engaging said inclined surfaces of the ring sections to expand the same laterally.

14. A piston of the character described, comprising a body formed of longitudinal sections, a plate extending across the inner ends of said sections, and adjusting means connected to and arranged inside said plate and adapted to expand said sections.

15. A piston of the character described, comprising a body formed of longitudinal sections, a plate adapted to extend over said longitudinal sections, an expansible ring interposed between said plate and the ends of said longitudinal sections, and adjusting means connected to said plate and arranged to expand said sections.

16. The combination with a cylinder and a piston, of an expansible packing ring on said piston, means for forcing said ring outwardly into bearing with the cylinder wall, and means actuated by pressure within the cylinder for clamping said ring in its expanded position.

JOSEPH REIF.